(12) United States Patent  
Rosenberg et al.

(10) Patent No.: US 10,678,006 B2  
(45) Date of Patent: Jun. 9, 2020

(54) OPTICAL INTERFACES WITH SOLDER THAT PASSIVELY ALIGNS OPTICAL SOCKET

(71) Applicant: HEWLETT PACKARD ENTERPRISE DEVELOPMENT LP, Houston, TX (US)

(72) Inventors: Paul Kessler Rosenberg, Palo Alto, CA (US); Michael Renne Ty Tan, Palo Alto, CA (US); Kevin Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 136 days.

(21) Appl. No.: 15/283,181

(22) Filed: Sep. 30, 2016

(65) Prior Publication Data

US 2018/0095228 A1 Apr. 5, 2018

(51) Int. Cl.
   *G02B 6/42* (2006.01)
(52) U.S. Cl.
   CPC ........... *G02B 6/4232* (2013.01); *G02B 6/428* (2013.01); *G02B 6/4231* (2013.01); *G02B 6/4238* (2013.01); *G02B 6/4292* (2013.01)
(58) Field of Classification Search
   CPC .. G02B 6/4232; G02B 6/4238; G02B 6/4231; G02B 6/4292; G02B 6/428
   See application file for complete search history.

(56) References Cited

U.S. PATENT DOCUMENTS

| | | | |
|---|---|---|---|
| 5,671,311 | A | 9/1997 | Stillie et al. |
| 5,732,175 | A | 3/1998 | Fan |
| 5,781,682 | A | 7/1998 | Cohen et al. |
| 6,019,519 | A | 2/2000 | Grinderslev et al. |
| 6,198,864 | B1 | 3/2001 | Lemoff et al. |

(Continued)

FOREIGN PATENT DOCUMENTS

| | | |
|---|---|---|
| CN | 100472258 C | 3/2009 |
| EP | 1182478 | 2/2002 |

(Continued)

OTHER PUBLICATIONS

Chuang, S. et al., "Development and Qualification of a Mechanical-optical Interface for Parallel Optics Links." (Research Paper). Feb. 11, 2015, 8 pages. available at http://www.usconec.com/LiteratureRetrieve.aspx?ID=222018.

(Continued)

*Primary Examiner* — Akm E Ullah
(74) *Attorney, Agent, or Firm* — Sheppard Mullin Richter & Hampton LLP

(57) ABSTRACT

An example method of manufacturing an optical interface. An optical socket may be provided that has an alignment feature that is to engage an optical connector, and first solder attachment pads. A printed circuit board may be provided that has an active optical device and second solder attachment pads. The optical socket may be connected to the printed circuit board by reflowing solder between the first and second solder attachment pads. The first and second solder attachment pads, the alignment feature, and the active optical device are positioned such that, while reflowing the solder, the solder automatically forces the optical socket into an aligned position.

20 Claims, 13 Drawing Sheets

(56) References Cited

U.S. PATENT DOCUMENTS

| | | | |
|---|---|---|---|
| 6,209,928 B1 | 4/2001 | Benett | |
| 6,250,818 B1 | 6/2001 | Loughlin et al. | |
| 6,540,414 B1 | 4/2003 | Brezina et al. | |
| 6,682,230 B1 | 1/2004 | Demangone | |
| 6,815,729 B1* | 11/2004 | Brophy | H01S 5/02248 |
| | | | 257/680 |
| 6,861,641 B1 | 3/2005 | Adams | |
| 6,863,450 B2* | 3/2005 | Mazotti | G02B 6/4251 |
| | | | 385/92 |
| 6,890,107 B1* | 5/2005 | Brophy | G02B 6/4201 |
| | | | 385/88 |
| 7,076,144 B2 | 7/2006 | Loder et al. | |
| 7,129,722 B1* | 10/2006 | Brophy | G01R 31/304 |
| | | | 324/750.25 |
| 7,281,856 B2 | 10/2007 | Grzegorzewska et al. | |
| 7,281,862 B2 | 10/2007 | Oen et al. | |
| 7,329,054 B1* | 2/2008 | Epitaux | G02B 6/4249 |
| | | | 385/89 |
| 8,277,128 B2 | 10/2012 | Hackett | |
| 8,398,421 B2 | 3/2013 | Haberek et al. | |
| 8,591,244 B2 | 11/2013 | Thomas et al. | |
| 8,932,084 B2 | 1/2015 | Thackston et al. | |
| 9,235,019 B2 | 1/2016 | Shastri et al. | |
| 9,325,445 B2 | 4/2016 | Khor et al. | |
| 9,470,858 B2* | 10/2016 | Houbertz-Krauss | |
| | | | G02B 6/4206 |
| 9,651,745 B2* | 5/2017 | Chou | G02B 6/4231 |
| 9,927,581 B1 | 3/2018 | Rosson et al. | |
| 10,330,872 B2 | 6/2019 | Rosenberg et al. | |
| 2002/0172469 A1 | 11/2002 | Benner | |
| 2003/0201462 A1 | 10/2003 | Pommer et al. | |
| 2004/0109649 A1 | 6/2004 | Mazotti et al. | |
| 2006/0088248 A1 | 4/2006 | Tran | |
| 2007/0297713 A1* | 12/2007 | Lu | G02B 6/421 |
| | | | 385/14 |
| 2009/0003826 A1 | 1/2009 | Jeon et al. | |
| 2010/0054671 A1* | 3/2010 | Ban | G02B 6/43 |
| | | | 385/88 |
| 2011/0108716 A1* | 5/2011 | Shiraishi | G02B 6/4249 |
| | | | 250/227.24 |
| 2011/0111624 A1 | 5/2011 | Ball | |
| 2011/0268397 A1* | 11/2011 | Meadowcroft | G02B 6/4214 |
| | | | 385/94 |
| 2011/0280523 A1* | 11/2011 | Yeh | G02B 6/3897 |
| | | | 385/89 |
| 2012/0014639 A1 | 1/2012 | Doany et al. | |
| 2012/0027345 A1 | 2/2012 | Castagna et al. | |
| 2012/0121218 A1 | 5/2012 | Kim et al. | |
| 2012/0163811 A1 | 6/2012 | Doany et al. | |
| 2013/0209040 A1 | 8/2013 | Graham et al. | |
| 2013/0216190 A1 | 8/2013 | Haley et al. | |
| 2013/0266255 A1* | 10/2013 | Tan | G02B 6/4259 |
| | | | 385/14 |
| 2013/0272649 A1* | 10/2013 | Braunisch | G02B 6/12 |
| | | | 385/14 |
| 2014/0049292 A1* | 2/2014 | Popescu | G02B 6/43 |
| | | | 327/100 |
| 2014/0061452 A1 | 3/2014 | Schade | |
| 2014/0105549 A1 | 4/2014 | Kohnishi | |
| 2014/0154914 A1 | 6/2014 | Schneider | |
| 2014/0179129 A1* | 6/2014 | Chan | H01R 12/7029 |
| | | | 439/78 |
| 2014/0334778 A1 | 11/2014 | Walker et al. | |
| 2015/0063760 A1 | 3/2015 | Pommer et al. | |
| 2015/0079815 A1* | 3/2015 | Leigh | H01R 12/7076 |
| | | | 439/74 |
| 2015/0131940 A1* | 5/2015 | Rosenberg | G02B 6/4259 |
| | | | 385/14 |
| 2015/0277067 A1 | 10/2015 | Droesbeke | |
| 2015/0301293 A1 | 10/2015 | Seetharam et al. | |
| 2015/0325527 A1* | 11/2015 | Rosenberg | G02B 6/4231 |
| | | | 257/499 |
| 2016/0116695 A1 | 4/2016 | Nekado et al. | |
| 2016/0195677 A1 | 7/2016 | Panotopoulos et al. | |
| 2016/0209610 A1 | 7/2016 | Kurtz et al. | |
| 2017/0131492 A1 | 5/2017 | Vallance et al. | |
| 2017/0341972 A1 | 11/2017 | Bookbinder et al. | |
| 2018/0217335 A1 | 8/2018 | Leeson et al. | |
| 2019/0018203 A1* | 1/2019 | Rosenberg | G02B 6/4292 |
| 2019/0074617 A1* | 3/2019 | Rosenberg | H01R 12/716 |
| 2019/0146167 A1* | 5/2019 | Leigh | G02B 6/4246 |
| 2019/0157783 A1* | 5/2019 | Leigh | H01R 12/714 |

FOREIGN PATENT DOCUMENTS

| | | |
|---|---|---|
| EP | 1315991 | 6/2003 |
| WO | WO-9400785 | 1/1994 |
| WO | WO-20111008041 A2 | 1/2011 |
| WO | WO-2014021231 | 2/2014 |
| WO | WO-2014068357 | 5/2014 |

OTHER PUBLICATIONS

Delta Electronics, Inc., "Small Form Factor Bi-directional Transceiver Module for Gigabit Ethernet," SFBD-1250A4K1RS, Sep. 1, 2009, pp. 1-9, Revision: S3.

Neutrik; "opticalCON" (Web Page), Feb. 18, 2014, 40 pages, available at https://www.fclane.com/sites/default/files/Product%20Folder%20opticalCON.pdf.

PCT; "International Search Report" cited in Appl. No. PCT/US2016/019747; dated Oct. 27, 2016, 3 pages.

Rosenberg, P. K., et al.; "Non-Final Office Action cited in U.S. Appl. No. 15/650,197"; dated Aug. 9, 2018; 13 pages.

Rosenberg, P. K.; "Office Action 3mo." dated Nov. 2, 2018; 15 pages.

International Search Report and Written Opinion received for PCT Patent Application No. PCT/US2015/062334, dated Aug. 22, 2016, 10 pages.

European Search Report and Search Opinion Received for EP Application No. 16891836.5, dated Oct. 22, 2018, 8 pages.

European Search Report and Search Opinion Received for EP Application No. 15909401.0, dated Oct. 25, 2018, 7 pages.

* cited by examiner

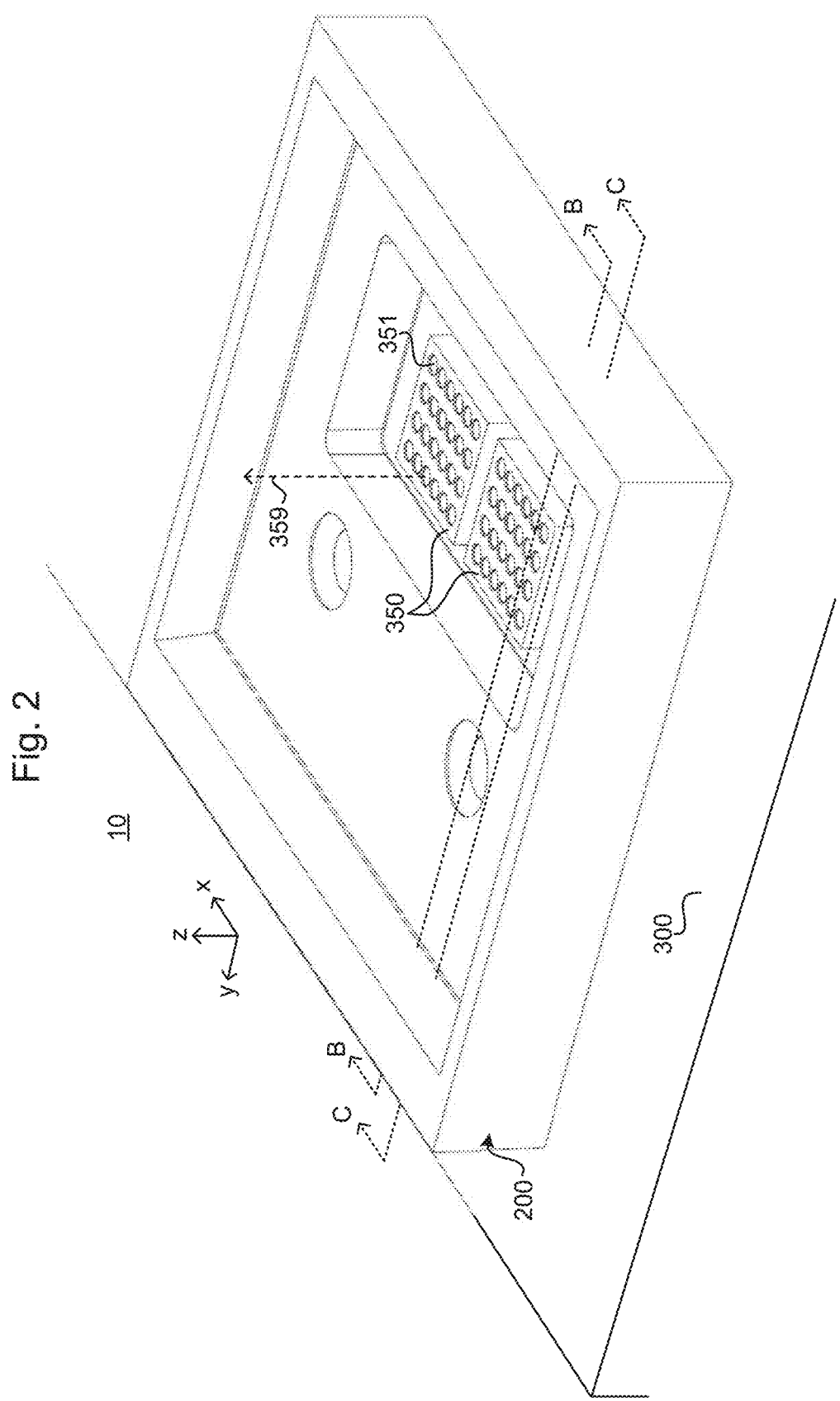

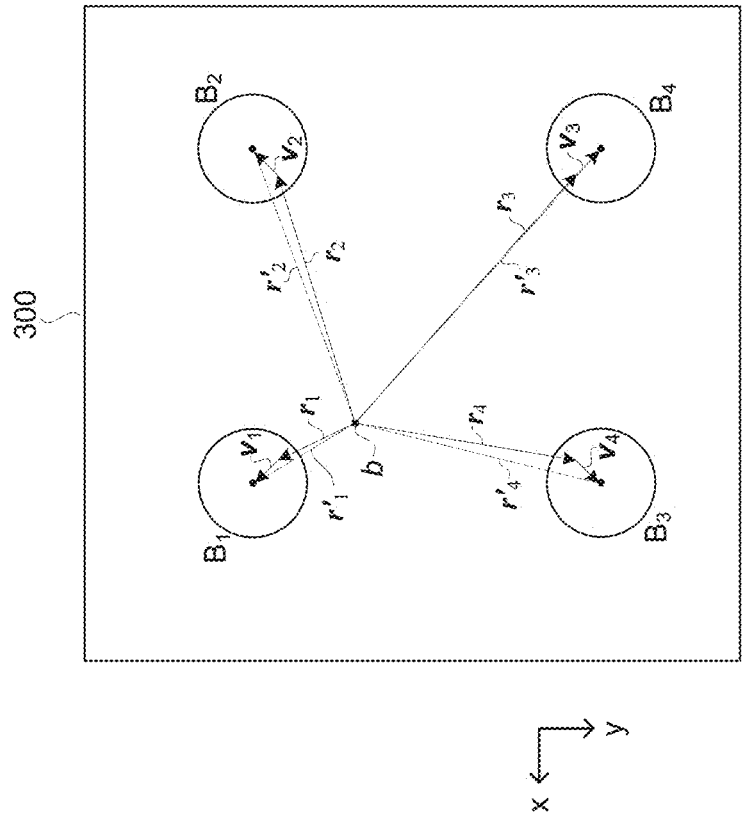
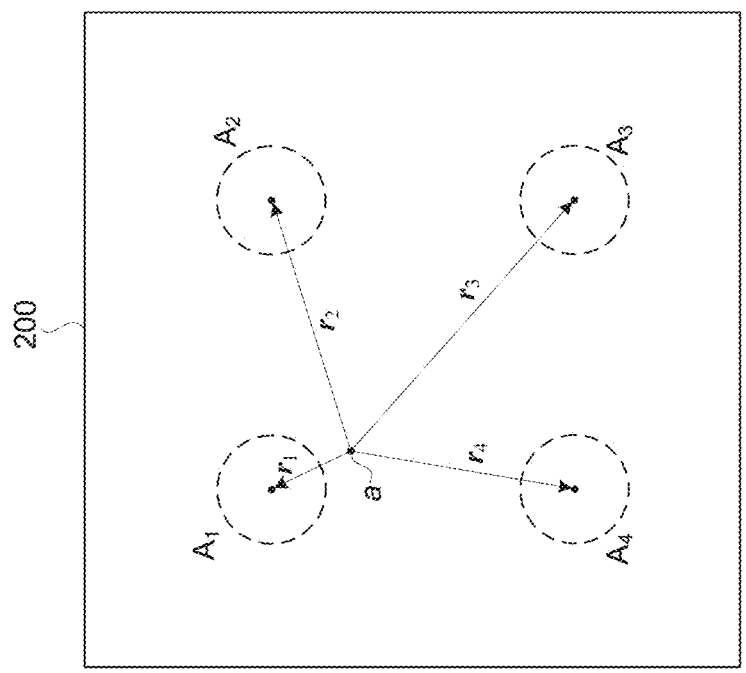
Fig. 16

OPTICAL INTERFACES WITH SOLDER THAT PASSIVELY ALIGNS OPTICAL SOCKET

BACKGROUND

Optical signals may be used for high speed data communication. An optical interface may be used to convert such optical signals into electronic signals and vice versa. An optical interface may include a connector assembly to which optical fiber cables (hereinafter "cables") may be connected and an electro-optical subassembly that may convert optical signals carried on the cables to electrical signals and convert signals transferred electrically to the interface via copper traces on a PCB into optical signals. The electro-optical subassembly may include active optical devices (such as LEDs, lasers, photodiodes, etc.), ASICs, and other electronic elements, which may be formed or assembled on a printed circuit board (PCB). The optical connector assembly may include structures that are to hold optical connectors of the cables in alignment with the optical devices of the electro-optical subassembly so that optical signals may be communicated between the optical devices and the cables.

BRIEF DESCRIPTION OF THE DRAWINGS

FIG. 2 is a perspective view of an example optical interface.

FIG. 16 is a conceptual diagram illustrating locations of example solder attachment pads on an optical socket relative to a first reference point a and locations of example solder attachment pads on a printed circuit board relative to a second reference point b.

DETAILED DESCRIPTION

Figure 1A:
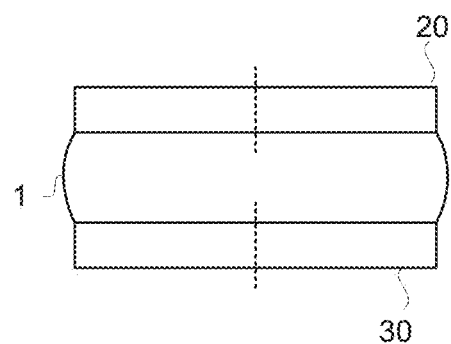
FIG. 1A is a conceptual diagram illustrating a volume of liquid solder interposed between a pair of example solder attachment pads in a state in which their respective centers are laterally aligned.

A connector assembly of an optical interface may include an optical socket that is attached to the PCB near the electrical subassembly. The optical socket may allow optical connectors of cables to be selectively mated to and demated from the optical socket. In order for optical signals to be efficiently communicated between the optical devices of the electro-optical subassembly and the optical elements such as lenses, mirrors, prisms, etc., that are elements of the optical connector mated to the optical socket, the optical socket should be precisely aligned relative to the optical devices. Specifically, when an optical connector is mated to the optical socket, an optical axis of the optical connector should be aligned with a corresponding light transmitting or receiving region of the optical devices and an optical axis of the optical devices should be aligned with a corresponding light transmitting or receiving region of the connector, so that light constituting a communication signal that is emitted by one is received with sufficient strength and signal integrity by the other. For example, in certain contexts it may be desirable for the optical socket to be aligned relative to the optical device with a precision on the order of ±1 µm to ±10 µm in order to ensure acceptable functioning of the optical interface.

Example techniques disclosed herein allow such precise alignment of the optical socket relative to optical devices to be achieved automatically (passively) during a process of attaching the optical socket to the subassembly. Specifically, in examples disclosed herein, alignment may be achieved without a person or machine having to manually move the optical socket into alignment relative to the optical devices. Instead, in certain examples, the optical socket and/or PCB may be configured such that solder that is used to attach the optical socket to the PCB exerts forces on the optical socket during an attachment process that automatically move the optical socket into an aligned position.

In particular, the optical socket and the electro-optical (EO) subassembly may each have solder attachment pads that may be arranged precisely relative to one another, relative to an alignment feature of the optical socket, and relative to the optical devices that are part of the EO subassembly. The optical socket and the EO subassembly may be connected to each other via a solder reflow process, and due to the precise arrangement of the solder attachment pads, during the solder reflow process, the liquid solder automatically forces the optical socket into an aligned position. Specifically, the solder attachment pads may be arranged such that if the optical socket is out of alignment, surface tension of the liquid solder generates a non-zero net lateral force and/or a non-zero net lateral torque that automatically laterally moves and/or rotates the optical socket toward alignment. Moreover, the solder attachment pads may be arranged such that an equilibrium position of the optical socket in view of the forces generated by the solder corresponds to the aligned position. Thus, in the examples disclosed herein, precise alignment of the optical socket may be ensured automatically (passively) during assembly of the optical socket to the PCB.

Moreover, by appropriate design of the size of the solder pads and the volume of the solder spheres, it is possible to precisely control the height of the socket above the substrate. This dimension can impact the efficiency of optical coupling between active optical devices and the optical connector.

Previously, obtaining such precision in alignment of the optical socket relative to the optical devices may have required difficult, time consuming, and/or expensive manual or automated alignment processes to be performed. For example, certain manual alignment processes may have included a person and/or machine painstakingly moving around the optical socket and repeatedly checking alignment until a desired precision of alignment is achieved and then fixing the optical socket to the PCB. The repeated checking of alignment during such manual alignment processes may have included vision-aided techniques (e.g., visually observing relative locations of alignment markers) or active alignment techniques (e.g., measuring qualities of signals that are sent through and received from the optical interface). These alignment processes may take a long time to perform, and may require expensive custom assembly equipment and/or specialized adhesives such as light cure adhesives. Thus, because the examples disclosed herein may allow such alignment processes to be omitted, the examples disclosed herein may save substantially on assembly costs and the time required for assembly. In addition, the examples disclosed herein may allow for multiple optical sockets to be aligned as a batch in a single process, in contrast to the alignment processes described above which, by their nature, generally are done one at a time.

[Context—Forces Exerted by the Solder]

As noted above, during reflow the solder may exert a force on the optical socket to cause the optical socket to be passively aligned. More specifically, each solder attachment pad of the optical socket may have a volume of liquid solder that is wetted/attached to it and to a corresponding solder attachment pad on the PCB, and each volume of liquid solder may exert forces on the solder attachment pads to which it is wetted/attached. The sum of all of these forces over all of the solder attachment pads is translated into a net lateral force and/or a net lateral torque on the optical socket, and this net lateral force/torque may cause the optical socket to move/rotate automatically to an aligned position.

The force exerted by a volume of liquid solder on the solder attachment pads to which it is wetted/attached may result from surface tension of the liquid solder. Liquid solder prefers to take a shape in which its surface area is minimized (in the context of existing constraints), since this represents the minimum energy state. If the current shape of a volume of liquid solder is not the shape that has the minimum surface area given the existing constraints, then surface tension forces will pull the liquid solder towards the minimum surface area shape. If the volume of liquid solder also happens to be wetted/attached to solder attachment pads, the pads may also be pulled along as the solder moves towards the minimum surface area shape. More specifically, the surface tension forces may be translated into forces that push/pull the pads by the attractive forces between the pads and the solder.

In the absence of other constraints, the minimum surface area shape would be a sphere. In the context of liquid solder that is sandwiched between two opposing solder attachment pads, the minimum surface area shape for the solder would depend on, among other things, the shapes and relative sizes of the solder attachment pads. For example, if the two opposing solder attachment pads are circles of equal size, then the minimum surface area shape would be approximately a spheroid with a flat top and bottom.

In general, the minimum surface area shape for solder that is sandwiched between opposing attachment pads occurs when the centers of the two opposing solder attachment pads are aligned from a top-down perspective. The minimum surface area shape occurs when the centers of the pads are aligned regardless of what the specific minimum area shape happens to look like. For example, FIG. 1A illustrates an example in which the centers of solder attachment pads 20, 30 are aligned, and therefore the volume of liquid solder 1 that is wetted and attached to the pads 20, 30 has the minimum surface area shape.

Figure 1B:
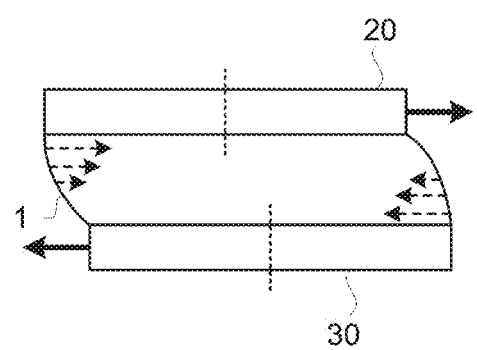
FIG. 1B is a conceptual diagram illustrating a volume of liquid solder interposed between a pair of example solder attachment pads in a state in which their respective centers are laterally offset.
Figure 3:
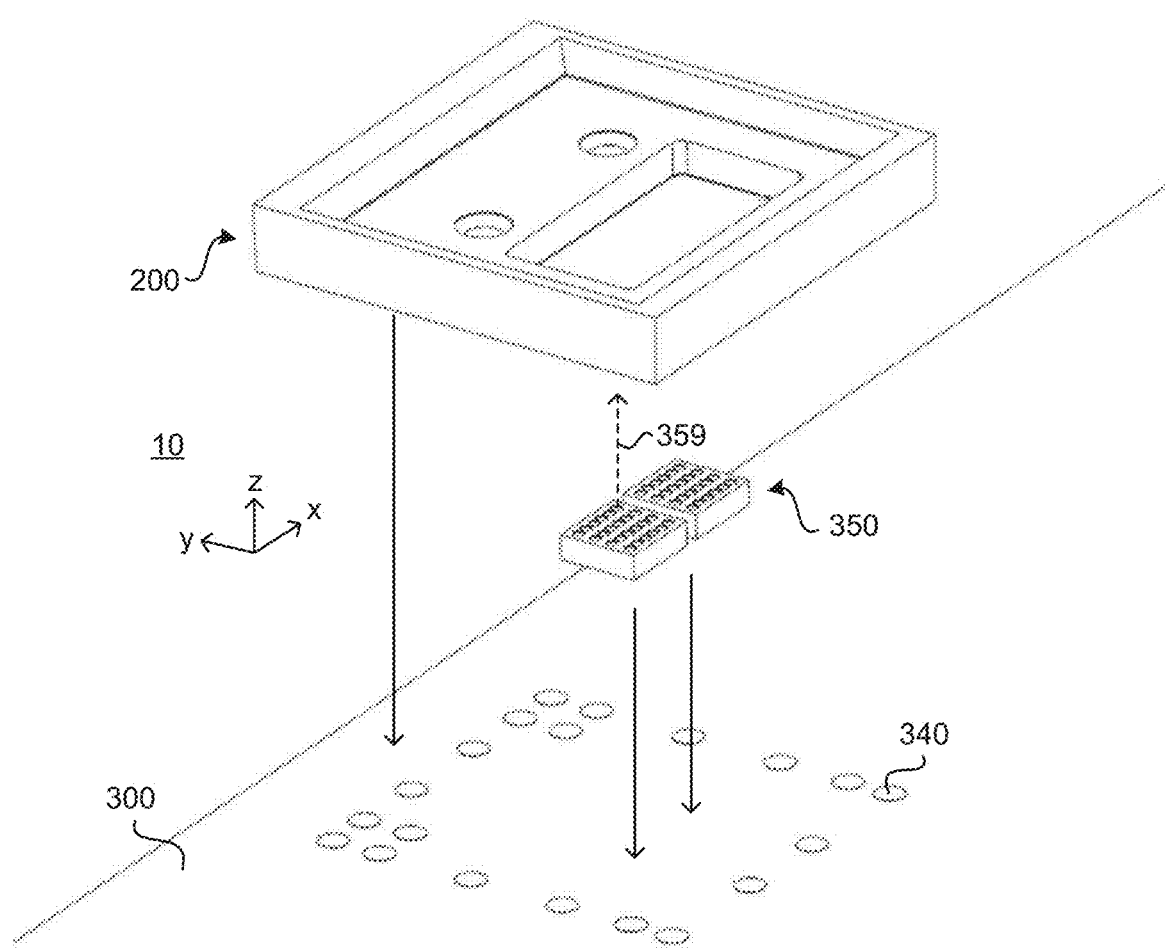
FIG. 3 is an exploded perspective view of an example optical interface.
Figure 4:
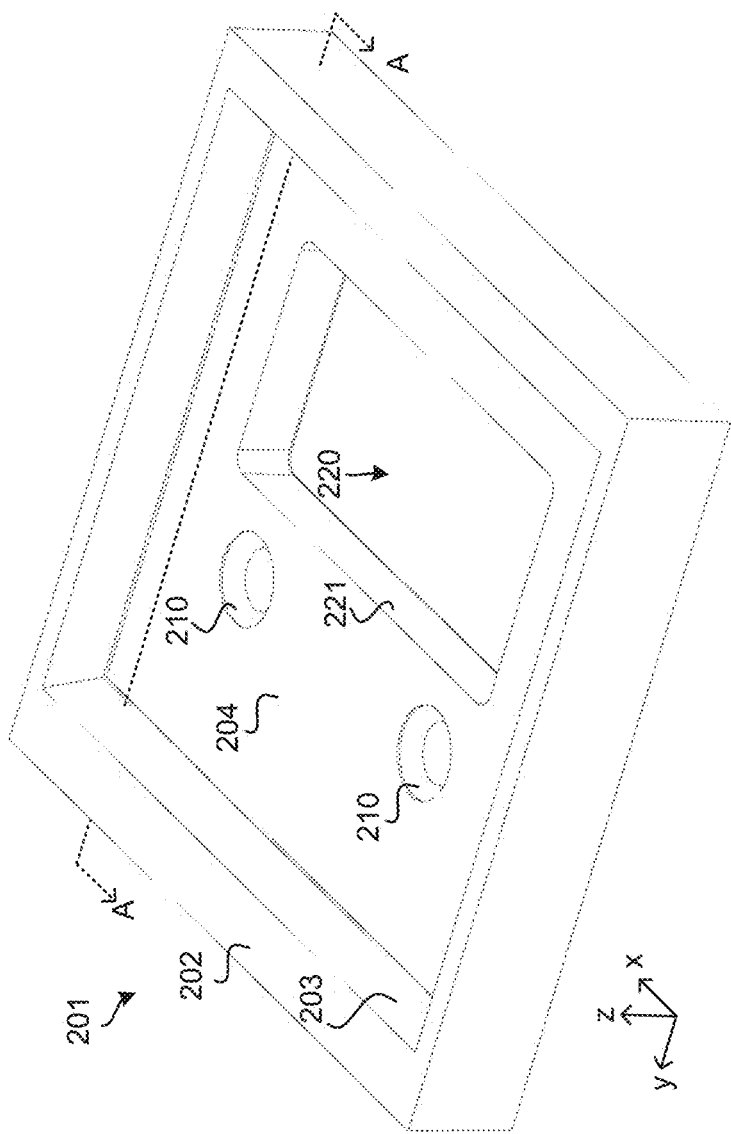
FIG. 4 is a perspective view of a top side of an example optical socket.
Figure 5:
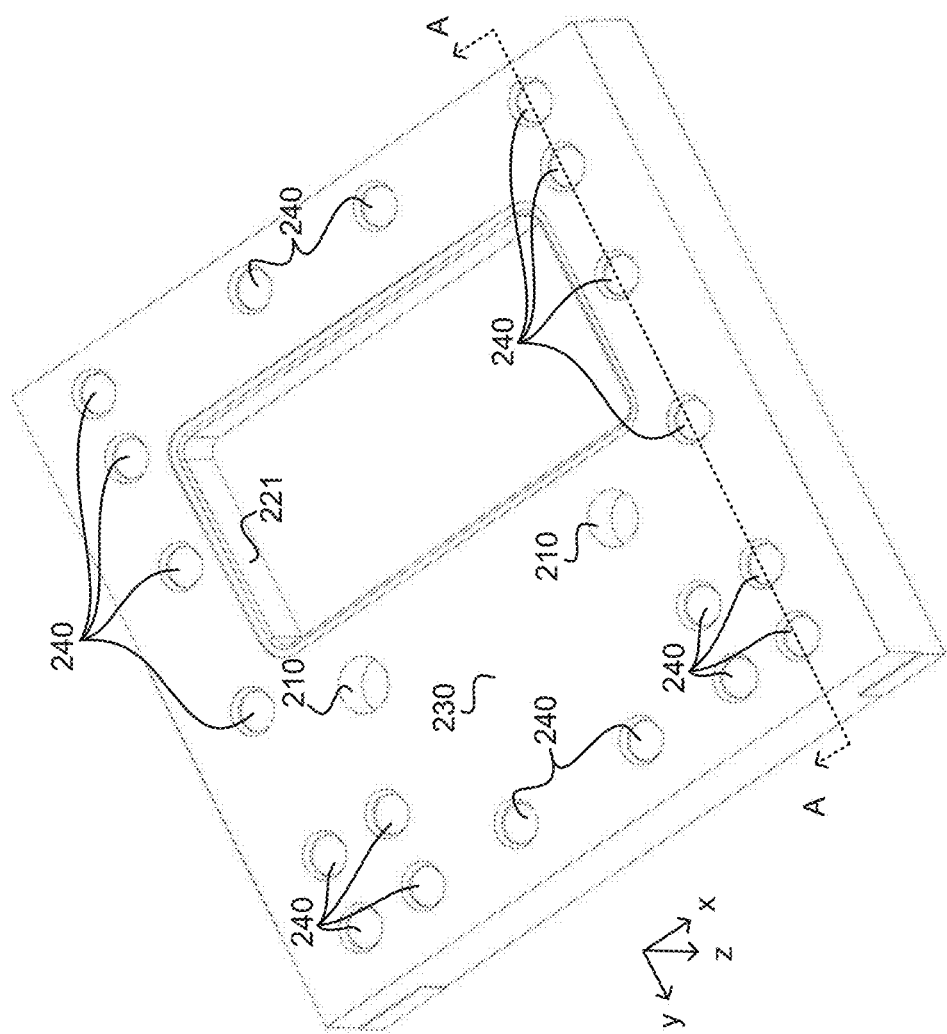
FIG. 5 is a perspective view of a bottom side of an example optical socket.
Figure 6:
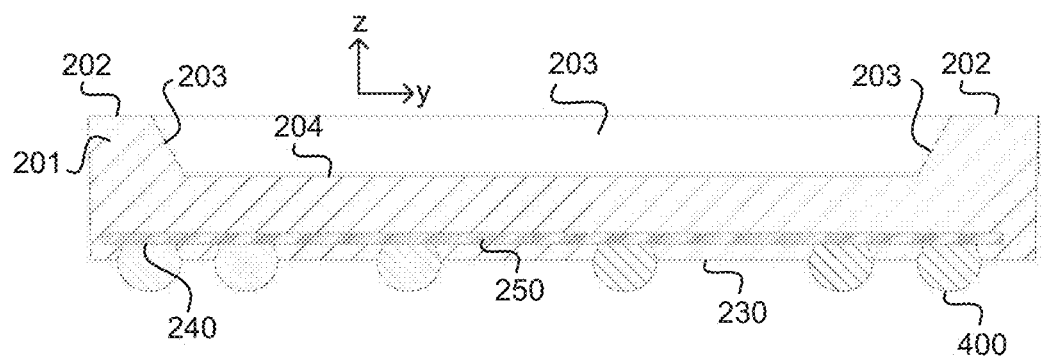
FIG. 6 is a cross section of an example optical socket with solder spheres, taken along the line A-A shown in FIG. 5.
Figure 7:
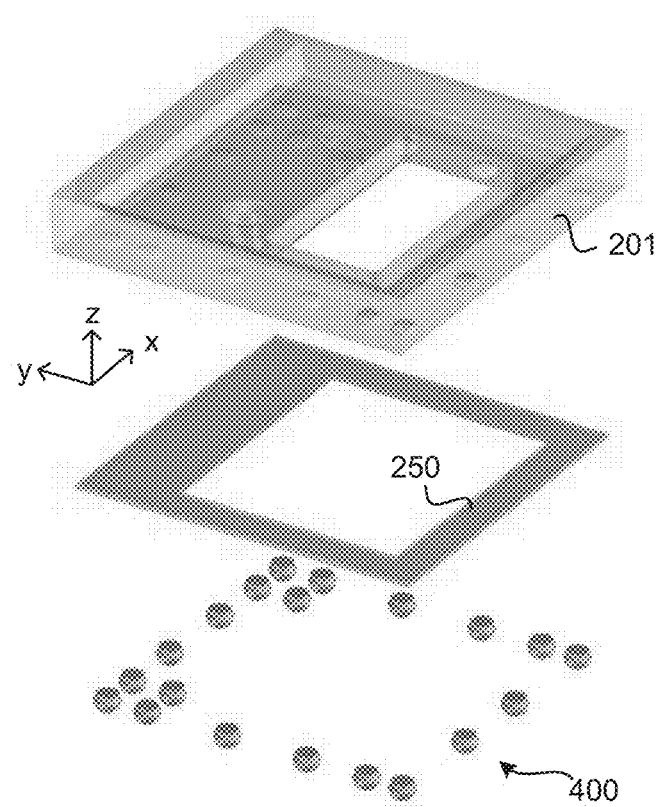
FIG. 7 is an exploded perspective view of an example optical socket, attachment part, and solder spheres.

Conversely, when the centers of the solder attachment pads are not aligned from the top down perspective, the solder will not have the minimum surface area shape. For example, FIG. 1B illustrates an example in which the centers of the solder attachment pads 20, 30 are not aligned, and therefore the volume of liquid solder 1 that is wetted and attached to the pads 20, 30 does not have the minimum surface area shape.

When the centers of the solder attachment pads are not aligned, the forces generated by the solder tend to push/pull the solder attachment pads back towards the positions in which their centers are aligned. In particular, a lateral component of the force exerted by the solder on one of the solder attachment pads will have a direction pointing towards the center of the other solder attachment pad (an equal and opposite force is exerted on the other one of the pads). For example, in FIG. 1B, in order to pull the liquid solder 1 back towards the minimum area shape, the surface tension forces (represented in FIG. 1B by the dashed-line arrows) pull a left portion of the liquid solder 1 towards the right and a right portion of the liquid solder 1 towards the left, and since the liquid solder 1 is wetted/attached to the solder attachment pads 20, 30, the attachment forces between the liquid solder 1 and the solder attachment pads 20, 30 translate the surface tension forces into lateral forces exerted on the solder attachment pads 20, 30 (represented in FIG. 1B by solid arrows) pulling the top pad 20 to the right and the bottom pad 30 to the left.

For simplicity, solder attachment pads that are on the optical socket will be referred to hereinafter as "first pads" and solder attachment pads that are on the PCB will be referred to hereinafter as "second pads".

The magnitudes of the lateral forces exerted on a pair of corresponding first and second pads may depend on how far the centers of the corresponding pads are from being laterally aligned. In particular, if we define a pad-offset vector $v_i$ to be the lateral component of a vector pointing from the center of an $i^{th}$ first pad to the center of its corresponding second pad, then the lateral force $f_i$ exerted on the $i^{th}$ first pad may be represented as $f_i = f(v_i)$, where $f$ is a function that maps the pad-offset vector $v_i$ to the force $f_i$, and where $f(0)=0$. The specific relationship between the magnitude of the lateral force $f_i$ and the distance between the pads (i.e., the specific nature of the function $f$) may depend on the materials used for the solder and attachment pads and on the shapes and sizes of the pads.

In addition, the lateral force $f_i$ exerted on a given first pad may be translated into a lateral torque on the optical socket $\tau_i$ since the optical socket may be free to rotate about its center of mass during solder reflow. The lateral torque $\tau_i$ may be given by $\tau_i=f_i\times l_i=f(\upsilon_i)\times l_i$, where $l_i$ is the lateral lever arm of the $i^{th}$ first pad (the lateral component of the vector from a center of mass of the optical socket to the center of the $i^{th}$ first pad).

The individual forces $f_i$ that are exerted by the solder on each of the first pads during a solder reflow process result in a net lateral force and a net lateral torque that are exerted on the optical socket. In particular, the net lateral force exerted on the optical socket ("F") may be given by $F=\Sigma f_i=\Sigma f(\upsilon_i)$ and the net lateral torque exerted on the optical socket ("T") may be given by $T=\Sigma\tau_i=\Sigma f_i\times l_i=\Sigma f(\upsilon_i)\times l_i$.

Although each individual lateral force $f_i$ may be relatively small, when multiple solder attachment pads are used the net lateral force F and/or the net lateral torque T may be sufficiently large to move/rotate the optical socket during solder reflow. Thus, the net lateral force F and a net lateral torque T may be harnessed to move/rotate the optical socket into an aligned position. In particular, the solder attachment pads may be arranged such that, when they are in an equilibrium state (i.e., when the net lateral force F and the net lateral torque T are both zero), the optical socket is in the aligned position. As a result, during the reflow process the optical socket will automatically move/rotate until it eventually comes to rest in the aligned position.

[Example Optical Interface]

FIGS. 2-11 illustrate an example optical interface 10. The example optical interface 10 may include a number of optical sockets 200, a PCB 300, and a number of active optical devices 350 for each optical socket 200. The optical sockets 200 and the active optical devices 350 may be connected to the PCB 300 (see FIGS. 2, 3, 8 and 9). In the Figures, one optical socket 200 is illustrated for simplicity, but multiple optical sockets 200 may be included in the optical interface 10. Moreover, in the Figures, multiple active optical devices 350 are illustrated per optical socket 200, but fewer (as few as one) or more active optical devices 350 could be included per optical socket 200.

Figure 8:
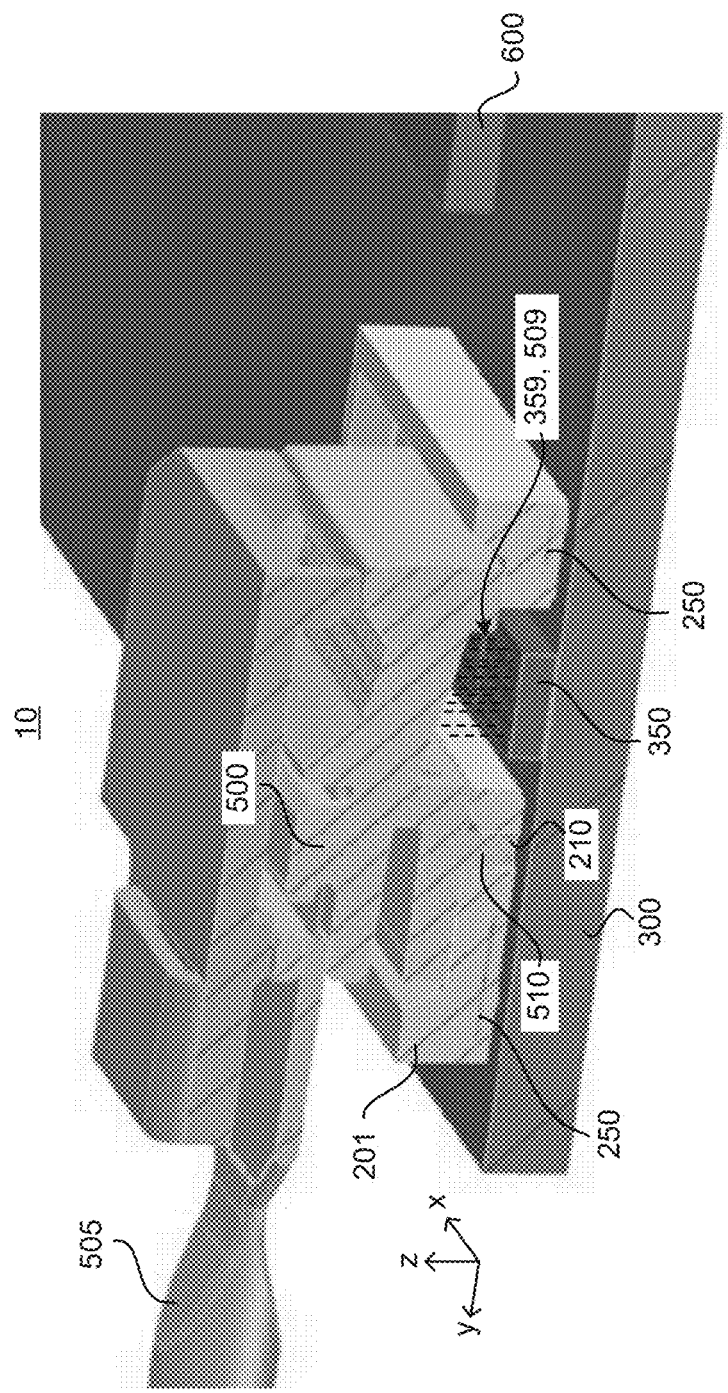
FIG. 8 is a perspective cross section of an example optical interface with optical connector mated to optical socket, taken along the line B-B shown in FIG. 2.
Figure 9:
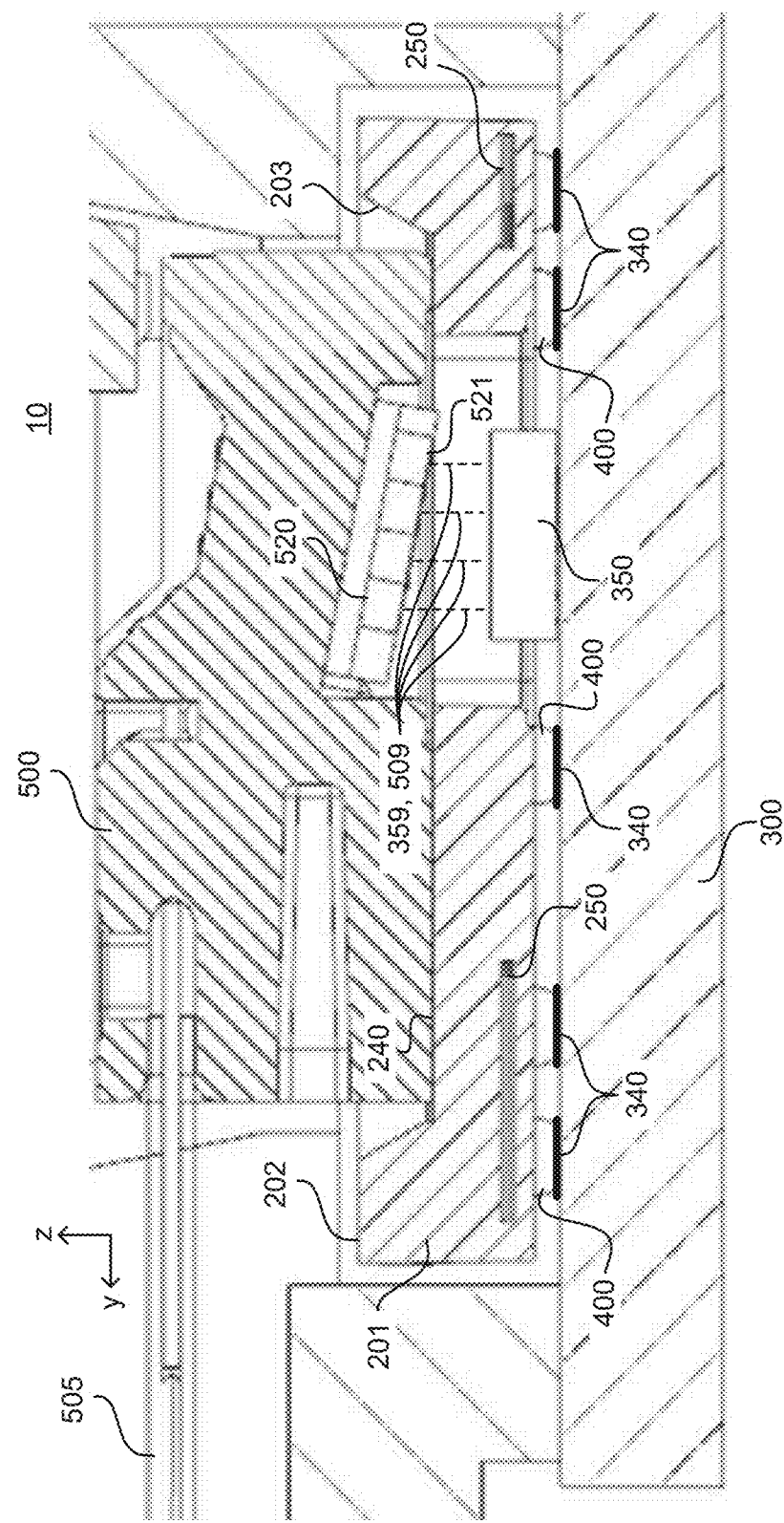
FIG. 9 is a cross section of an example optical interface with connector mated to optical socket, taken along the line C-C shown in FIG. 2.

The optical socket 200 is to mate with an optical connector, such as the example connector 500 (see FIGS. 8 and 9). The connector 500 may be connected to an optical cable 505 that is to carry optical signals via optical fibers (see FIGS. 8 and 9). The connector 500 may include optical components 520 (e.g., mirrors, lenses, etc.) that are to output optical signals and/or receive optical signals that impinge thereon. The connector 500 may have a number of optical axes 509, where each optical axis 509 corresponds to a propagation path for optical signals that are emitted from the connector 500 (see FIGS. 8 and 9). In certain examples, each optical axis 509 may correspond to a separate optical fiber of the optical cable 505. The optical components 520 may include light receiving regions 521 that are to receive optical signals from the active optical devices 350 and transfer the received optical signals to the optical fibers of the optical cable 505; for example, the light receiving regions 521 may be the end surfaces of optical fibers, lenses, mirrors, or other optical components.

The active optical devices 350 may include one or more devices that are to generate optical signals (e.g., lasers, LEDs, OLEDs, etc.) and/or one or more devices that are to receive optical signals (e.g., photodiodes, etc.). Those active optical devices 350 that are to generate optical signals may each have an optical axis 359, where each optical axis 359 corresponds to a propagation path for optical signals emitted from the center of the respective active optical device 350 (see FIGS. 2, 3, 8 and 9). Those active optical devices 350 that are to receive optical signals may each have a light receiving region 351 that is to receive optical signals from the connector 500. The light receiving regions 351 of the active optical devices 350 may either convert the received optical signals into electrical signals or may transfer the optical signals to some other portion of the device that converts the optical signals into electrical signals; for example, the light receiving regions 351 may be photodiodes, lenses, mirrors, or other optical components.

When the connector 500 is mated to the optical socket 200 (and when the optical socket 200 is in the aligned position), then each of the optical axis 509 of the connector 500 is aligned with a corresponding light reception region 351 of one of the active optical devices 350, and each of the optical axis 359 of the active optical devices 350 is aligned with a corresponding light reception region 521 of the connector 500 (see FIGS. 8 and 9). Thus, in this state, optical signals may be communicated between the connector 500 and the active optical devices 350. In several of the Figures, the optical axis 359 of the active optical devices 350 and the optical axis 509 of the connector 500 are illustrated as being co-linear when the optical socket is in the aligned position, but this need not necessarily be the case.

The optical socket 200 includes a body 201 and solder attachment pads 240 (see FIGS. 2-11). In certain examples, the body 201 may be a non-metallic material. In certain example, the body 201 may be plastic and may be formed by injection molding. The solder attachment pads 240 may be any material that has surface material properties that are attractive to liquid solder and to which liquid solder will wet and attach through a process of solidification. For example, the solder attachment pads 240 may be metallic. The locations of the solder attachment pads 240 may be arranged with high precision. For example, in some applications the precision may be ±10 μm. In other examples, the precision may be up to ±25 μm, while in other examples the precision may be as low as ±1 μm.

In several of the Figures (e.g., FIG. 5-7), the solder attachment pads 240 are illustrated as being recessed in the bottom face 230 of the body 201. In particular, in certain examples the optical socket 200 may include a frame 250 (also referred to herein as an attachment part) that is embedded in the body 201, and the solder attachment pads 240 may be formed from portions of the frame 250 that are exposed by holes in the bottom face 230 (see FIG. 5-7). For example, the frame 250 may be embedded in the body 201 while the body 201 is being formed by a process of insert-injection molding. The frame 250 may be any material that has surface material properties that are attractive to liquid solder and to which liquid solder will wet and attach through a process of solidification. For example, the frame 250 may be metallic.

In other examples (not illustrated), the solder attachment pads 240 need not necessarily be recessed from the bottom face 230. For example, the frame 250 may include protrusions (not illustrated) that extend downward to be flush with (or even extend below) the bottom face 230, and these protrusions may form the solder attachment pads 240. As another example, the solder attachment pads 240 may be formed as individual pads (not illustrated) that are connected to or disposed on or in the bottom face 230 (in such examples, the frame 250 may be omitted); for example, the solder attachment pads 240 may be composed of a conductive ink or other coating deposited on the bottom face 230.

The body 201 may include a top face 202 and a recessed face 204 that is recessed from the top face 202. The recessed face 204 may contact a bottom face of the connector 500 when the connector 500 is mated to the optical socket 200. The body 201 may include angled guide walls 203 between the top face 202 and the recessed face 204 that may help to guide the connector 500 into position to mate with the optical socket 201 as a user pushes the connector 500 downward. The body 201 may also include alignment features 210 and a window 220 defined by an opening 221 through which optical signals may be communicated. See generally FIGS. 2-11.

The alignment features 210 may be to engage with complementary alignment features 510 of the connector 500 when the connector 500 is mated to the optical socket 200 (see FIG. 8). The alignment features 210 are to, when engaged with the connector 500, align the connector 500 in a fixed position and orientation (as you mention below, the connector is held in place by a releasable latch). In particular, the alignment features 210 are to constrain lateral movement, yaw, pitch, and roll of the optical connector 500 when engaged therewith. The recessed face 204 may aid the alignment features 210 in constraining pitch and roll, and may further constrain the connector 500 from downward movement. Thus, the only direction of free movement that the connector 500 may have once mated to the optical socket 200 is upward (which will decouple the connector 500 from the optical socket 200). The alignment features 210 are precision features, which may be formed with extremely tight tolerances, such as, for example 10 µm or less in some applications. Thus, once the connector 500 is mated to the optical socket 200, the position and orientation of the optical connector 500 relative to the optical socket 200 is precisely fixed. For example, in some applications the precision with which the connector 500's position is fixed is to within ±10 µm. In other examples, the precision may be up to ±25 µm, while in other examples the precision may be as low as ±1 µm. As a result, if the optical socket 200 is properly aligned relative to the active optical devices 350, then it can be ensured that any connector 500 that is mated to the optical socket 200 will be in the proper position to send and receive signals. A releasable latch (not illustrated) may be added to the optical interface 10 to selectively constrain upward movement of the connector 500 once it is mated to the optical socket 200, thereby preventing unintentional decoupling.

In several of the Figures, the alignment features 210 are illustrated as two depressions in the body 201 that are roughly cylindrical in shape, which are to engage with two complementary alignment features 510 of the connector 500, which are illustrated as two protrusions that are roughly cylindrical in shape. However, this is merely one possible example, and the alignment features 210 could have configurations other than those illustrated. For example, the alignment features 210 could be protrusions rather than depressions (in which case the complementary alignment features 510 of the connector 500 may be complementary depressions). As another example, the alignment features 210 could include both protrusions and depressions. As another example, the alignment features 210 (whether depressions or protrusions) could have any shape, such as cuboids, pyramids, prisms, parallelepipeds, etc. As another example, there could be as few as one alignment feature 210, or more than two alignment features 210 for engaging with any number of complementary alignment features 510.

The PCB 300 includes solder attachment pads 340 that correspond, respectively, to the solder attachment pads 240 of the optical socket 200. In particular, when the optical socket is connected to the PCB 300, each of the solder attachment pads 240 is to be located opposite from a corresponding one of the solder attachment pads 340, with a volume of solder 400 interposed between the two corresponding pads and connected to both. The solder attachment pads 340 may be any material that has surface material properties that are attractive to liquid solder and to which liquid solder will wet and attach through a process of solidification. For example, the solder attachment pads 340 may be metallic. The solder attachment pads 340 may be formed, for example, by depositing individual pads on the top surface of the PCB 300. As another example, the solder attachment pads 340 may be recessed in the top surface of the PCB 300. The locations of the solder attachment pads 340 may be arranged with high precision. For example, in some applications the precision may be ±10 µm. In other examples, the precision may be up to ±25 µm, while in other examples the precision may be as low as ±1 µm.

In the example illustrated in FIGS. 2-11, the pattern of the solder attachment pads 240 is congruent to the pattern of the solder attachment pads 340 (i.e., when the patterns are overlaid, it is possible to locate the patterns relative to one another such that the center of each solder attachment pads 240 is aligned with the center of a corresponding one of the solder attachment pads 340). Because the patterns of solder attachment pads 240, 340 are congruent, an equilibrium position of the optical socket 200 during a solder reflow process is the position in which the center of each solder attachment pad 240 is aligned, from a top-down perspective, with the center of the corresponding solder attachment pad 340. Moreover, the solder attachment pads 240 are located relative to the alignment features 210, and the solder attachment pads 340 of are located relative to the active optical devices 350, such that when the optical socket 200 is in the equilibrium position the optical socket 200 is also in the aligned position. In particular, the locations of the solder attachment pads 240 relative to the alignment features 210 and the locations of the solder attachment pads 340 relative to the active optical devices 350 are mutually set such that, when the center of each solder attachment pad 240 is aligned, from a top-down perspective, with the center of the corresponding solder attachment pad 340, then the optical socket 200 is in the aligned position.

In FIGS. 2-11, the solder attachment pads 240, 340 are illustrated as having particular shapes, particular numbers, and particular sizes, and as being more-or-less identical to one another. However, this is merely one example. Any number of solder attachment pads 240, 340 may be used, any shapes may be used for the solder attachment pads 240, 340, any sizes may be used for the solder attachment pads 240, 340, and the solder attachment pads 240, 340 do not necessarily need to be identical. For example, a single ring-shaped solder attachment pad 240 may extend all the way around the perimeter of the bottom face 230 (with a corresponding solder attachment pad 340 on the PCB 300). As another example, strip-shaped solder attachment pads 240 may extend along the four sides of the bottom face 230 (with corresponding solder attachment pads 340 on the PCB 300). As another example, oblong solder attachment pads 240, 340 may be used. As another example, solder attachment pads 340 may be larger (or smaller) than their corresponding solder attachment pads 240.

In certain examples, after the solder reflow process has aligned the optical socket 200 and the solder has re-solidified, chemical or mechanical fasteners may be applied to the optical socket 200 to help fix the optical socket 200 in place. For example, epoxy may be applied around the outer base perimeter of optical socket 200 after solder reflowing to further secure the optical socket 200 on the PCB 300.

In certain examples, an integrated circuit 600 for processing communications that are sent/received via the optical interface 10 may be included on the PCB 300 (see FIG. 8). In such examples, optical interface 10 may be an optical transceiver module.

In certain examples, multiple optical sockets 200 may be included on the same PCB 300, each with their own number of active optical devices 350.

Figure 10:
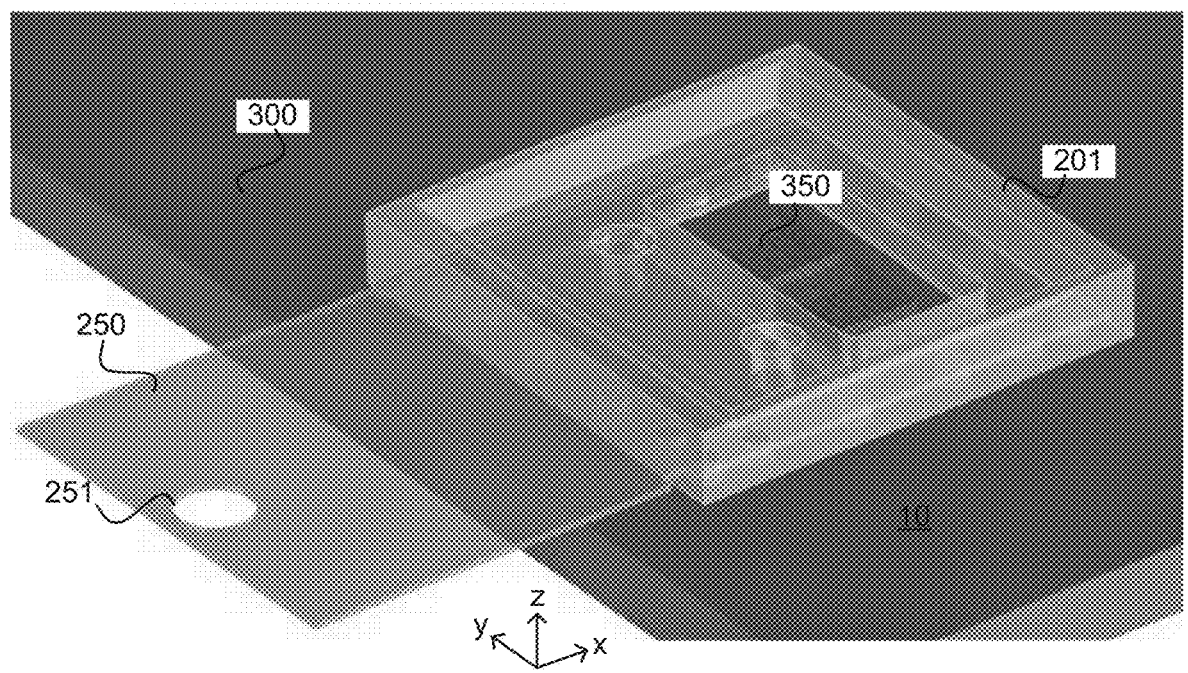
FIG. 10 is a perspective view of an example optical interface with an optical socket that has an attachment part that extends outside of the body of the optical socket.
Figure 11:
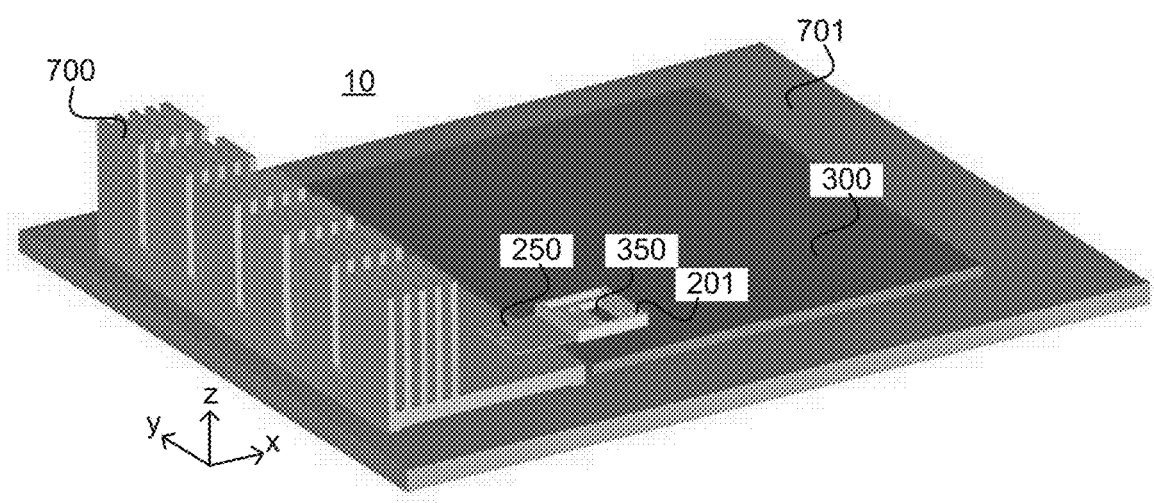
FIG. 11 is a perspective view of the example optical interface with an optical socket that has an attachment part that extends outside of the body of the optical socket and that is connected to a heat sink.

In certain examples, the frame 250 may extend outside of the body 201 on one or more sides thereof (see FIGS. 10 and 11). In such examples, a portion of the frame 250 that extends outside the body 201 may be connected to a heat sink 700 (see FIG. 11). For example, the optical socket 200 may be connected to the PCB 300 via a solder reflow process, during which process the optical socket 200 is automatically (passively) aligned, and then after the optical socket 200 has been fixed in place the frame 250 may be connected to the heat sink 700. This allows the frame 250 to help conduct heat generated by the optical components 350 toward the heat sink 700, thereby reducing thermal resistance and improving the cooling of the active optical components 350.

In particular, the solder attachment pads 340 may be positioned in close proximity around the active optical devices 350, and therefore heat may flow from the active optical device 350 into the solder attachment pads 340 via the substrate of the PCB 300. Furthermore, recall that the frame 250 has exposed portions (corresponding to the solder attachment pads 240) that are connected via solder to solder attachment pads 340 on the PCB 300. Thus, when the optical socket 200 is soldered to the PCB 300, the heat from the solder attachment pads 340 may flow to the frame 250 via the solder. As a result, metal paths are formed that serve to transfer heat generated in the active optical devices 350 into the ambient atmosphere (or into a cooling system).

For example, thermal interface material may be interposed between the frame 250 and the heat sink 700 in order to improve thermal coupling of the frame 250 to the heat sink 700. For example, the thermal interface material may be deposited on the underside or topside (whichever side contacts the heatsink) of the frame 250. The thermal interface material may be any material that facilitates heat transfer between the frame 250 and the heat sink 700, such as, for example, thermal grease, thermal paste, thermal glue, thermal gap filler, a thermal pad, a thermal adhesive, etc. In certain examples, the thermal interface material is graphene sheet. In certain examples, the thermal interface material may also function as an adhesive that secures the frame 250 to the heat sink 700. In other examples, mechanical fasteners may be used to secure the frame 250 to the heat sink; for example, a screw (not shown) may be inserted in a hole 251 in the frame 250 to mechanically secure and apply compression force on the frame 250 to the heat sink 700.

Many of the materials that are suitable for use in the frame 250 (for example, copper) are also able to conduct heat well, and therefore by connecting the frame 250 to the heat sink 700, a more thermally conductive path may be established between the active devices 350 and the heat sink 700.

The heat sink 700 illustrated in FIG. 11 is merely one example, and any heat sink 700 may be used. Moreover, in certain examples the heat sink 700 may be replaced by some other heat management component, such as a cold plate (not shown) of a cooling system such as a thermal electric cooling system, a liquid cooling system, etc. In the example illustrated in FIG. 11, the heat sink 700 is provided on a second substrate 701, to which the PCB 300 is attached; in such examples, the second substrate 701 and the PCB 300 may be attached to one another before, during, or after the solder reflow process in which the optical socket 200 is attached to the PCB 300. In other examples, the heat sink 700 may be provided on the PCB 300, and may be attached thereto before, during, or after the solder reflow process in which the optical socket 200 is attached to the PCB 300. In certain examples in which the heat sink 700 is present during the solder reflow process, a small vertical clearance may be included between the portion of the frame 250 that extends outside the body 201 and the heat sink 700, to reduce friction between the frame 250 and the heat sink 700 during the automatic (passive) alignment of the optical socket 200. In other examples, no vertical clearance may be included, as the friction may be insufficient to disrupt the automatic (passive) alignment of the optical socket 200.

It should be noted that the portion of the frame that is embedded in the socket, has exposed areas that are connected via solder to pads on the substrate. There may be many of these pads and they may be positioned in close proximity around the active optical devices. When the socket is soldered to the substrate, multiple metal paths are formed that serve to transfer heat generated in the active optical devices 350 into the ambient atmosphere. The low thermal resistance path is formed as follows: from active optical device into the substrate 300, then into the surrounding metal pads, then into solder columns connecting the socket to the substrate, then into the frame 250, then into the interface material, and finally into the heatsink.

[Manufacturing an Optical Interface]

Figure 12:
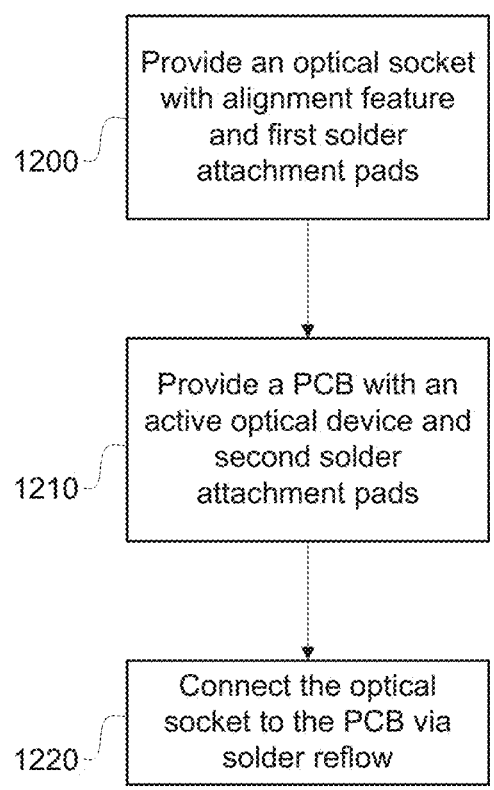
FIG. 12 is a process flow diagram illustrating an example process of manufacturing an optical interface.

FIG. 12 illustrates a process of manufacturing an optical interface.

In block 1200, an optical socket is provided that has an alignment feature and first solder attachment pads ("first pads"). The first pads may be arranged on a bottom side of the optical socket in a first pattern. The alignment feature is to engage an optical connector and thereby fix the position/orientation of the optical connector relative to the optical socket. For example, the alignment feature may constrain lateral movement, yaw, pitch, and roll of the optical connector when the optical connector is connected. An example of the optical socket that may be provided in block 1200 is the optical socket 200.

In certain examples, providing the optical socket may include forming the optical socket (in whole or in part). For example, the optical socket may be formed by a process of injection molding, or insert injection molding. In other examples, providing the optical socket may include obtaining a partially or completely formed optical socket.

In block 1210, a PCB is provided that has an active optical device and second solder attachment pads ("second pads"). The second pads may be arranged on a top side of the PCB in a second pattern. The active optical device may include, for example, a light detection device (such as a photodiode) and/or a light emission device (such as a laser, LED, OLED, etc.). Examples of the PCB and active optical devices that may be provided in block 1210 include the PCB 300 and active optical devices 350.

In certain examples, providing the PCB with the active optical device may include forming/assembly the PCB (in whole or in part), forming/assembling the active optical device (in whole or in part), or forming/assembling both (in whole or in part). In other examples, providing the optical socket may include obtaining a partially or completely formed PCB, obtaining a partially or completely formed active optical device, and/or assembling an active optical device on a PCB.

In block 1220, the optical socket is connected to the PCB by a solder reflow process. In particular, if solder is not already present on either of the first and second pads, then solder may be deposited on either the first or second pads. Once solder is present on the first pads or the second pads, then the optical socket may be placed on the PCB such that the volumes of solder are between pairs of first and second pads, and then the system may be heated to a temperature that causes the solder to reflow.

In the process of FIG. 12, the first pads and the second pads are arranged precisely relative to one another, relative to the alignment feature of the optical socket, and relative to the active optical device such that, during the solder reflow process, the optical socket is automatically (passively) forced into the aligned position.

The alignment feature of the optical socket fixes the position/orientation of the optical connector relative to the optical socket when it is mated to the optical socket, and therefore the position/orientation of the alignment feature relative to the PCB determines the position/orientation of the connector relative to the PCB when the connector is mated. Thus, by precisely arranging the first pads and second pads relative to each other, the alignment feature, and the active optical devices, the location of the connector when mated to the optical socket may be precisely arranged.

[Determining Locations for Solder Attachment Pads]

In the process of FIG. 12, an optical socket and a PCB are provided, which have first and second pads, respectively. In certain examples, providing the optical socket and the PCB may include arranging the first pads on the optical socket, arranging the second pads on the PCB, or arranging both the first and second pads. As noted above, the solder attachment pads need to be arranged precisely to achieve the automatic alignment of the optical socket. Thus, example processes for determining the locations of the solder attachment pads on the optical socket and/or on the PCB are described below.

In particular, the solder attachment pads may be precisely arranged in at least two respects: first, the solder attachment pads may be precisely arranged relative one another; second the solder attachment pads may be precisely arranged relative to the optical socket and the optical device on the PCB. The locations of the pads relative to one another determine an equilibrium state for the system, whereas the locations of the pads relative to the optical socket and PCB determine where the optical socket and PCB will be located when the system is in the equilibrium state.

Figure 13:
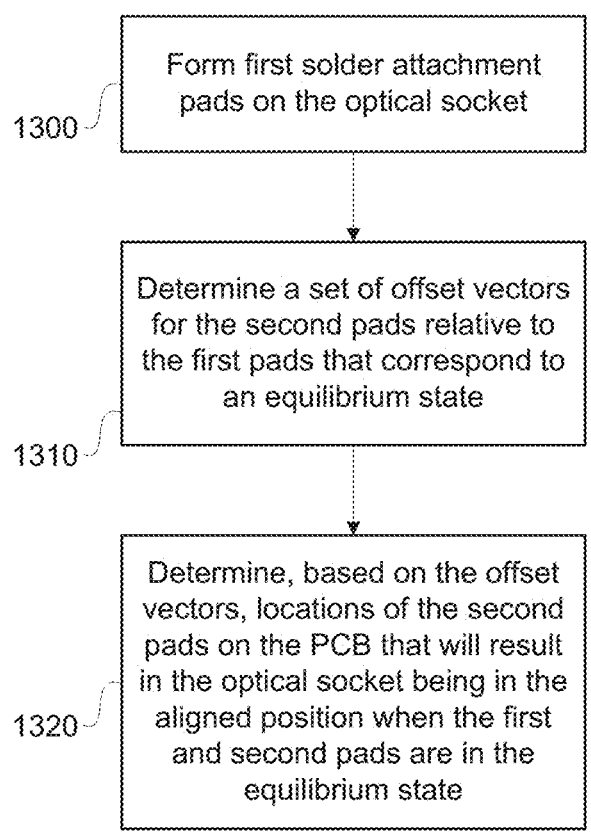
FIG. 13 is a process flow diagram illustrating an example process of determining locations of solder attachment pads on an optical socket and on a printed circuit board.

FIG. 13 illustrates an example process for determining locations of first and second pads.

In block 1300, locations of the first pads on the optical socket may be determined, and the first pads may be formed on the optical socket. In determining the locations of the first pads, any pattern may be used to arrange the first pads on the bottom of the optical socket. For example, the number of first pads that are used may be set based on considerations such as a desired strength of attachment between the optical socket and the PCB and a desired strength of a net lateral force during the solder reflow. As another example, the first pads may be distributed around the area of the bottom side of the optical socket in a manner that distributes the weight of the optical socket so that the optical socket does not list and get stuck during solder reflow.

In certain examples, the optical socket may already have the first pads formed thereon, in which case block 1300 may be omitted.

In block 1310, locations of the second pads relative to their corresponding first pads may be determined that corresponds to an equilibrium state. In other words, a set of offsets $\{v_i\}$ may be determined, where each offset $v_i$ indicates how far and in what direction the $i^{th}$ second pad would be laterally offset from its corresponding $i^{th}$ first pad in the equilibrium state. The equilibrium state is a state in which the net lateral force F and the net lateral torque T would both be zero during solder reflow. Any set of offsets $\{v_i\}$ may be used, as long as $\Sigma f(v_i)=0$ and $\Sigma f(v_i) \times l_i=0$ are true for the set $\{v_i\}$.

Figure 14:
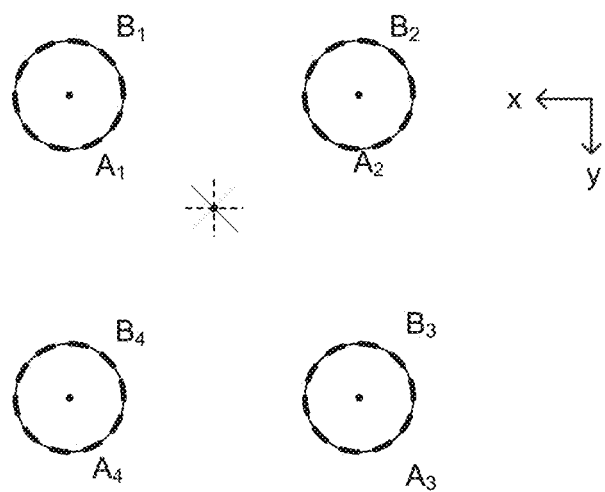
FIG. 14 is a conceptual diagram illustrating an equilibrium state of example solder attachment pads arranged on an optical socket in a first pattern and example solder attachment pads arranged on a printed circuit board in a second pattern that is congruent to the first pattern.

For example, the locations of the second pads relative to the first pads may be set such that the center of each second pad is aligned, from a top-down perspective, with the center of its corresponding first pad (i.e., the second pads may be arranged in a pattern that is congruent to the pattern of the first pads). In other words, each offset vector $v_i$ may be equal to zero. FIG. 14 illustrates such an example. In FIG. 14, each of the second pads $B_1$-$B_4$ (illustrated with solid lines) is located relative to its corresponding first pad $A_1$-$A_4$ (illustrated with dashed lines) such that their centers are aligned from a top-down perspective. Thus, in this state each of the offset vectors $v_1$-$v_4$ has zero magnitude, and therefore each of the lateral forces $f_1$-$f_4$ has zero magnitude. As a result, the net lateral force F and net lateral torque T are both zero, and therefore this corresponds to the equilibrium state of the system.

In certain circumstances, it may be advantageous to change the pattern of the second pads so that it is not congruent with the pattern of the first pads. For example, by having some pairs of first and second pads that have a non-zero offset $v_i$ in the equilibrium position, a strength of the net lateral force F for small displacements may be increased, which may aid in the alignment of the optical socket. In particular, when congruent patterns are used for the first and second pads, small displacements of the optical socket from the aligned position tend to produce small net lateral forces F. However, if some of the patterns are offset while in the equilibrium state, then even a relatively small displacement of the optical socket may result in a larger net force F since the small displacement may translate into a relatively large offset for the pads that are already offset in the equilibrium state.

Figure 15:
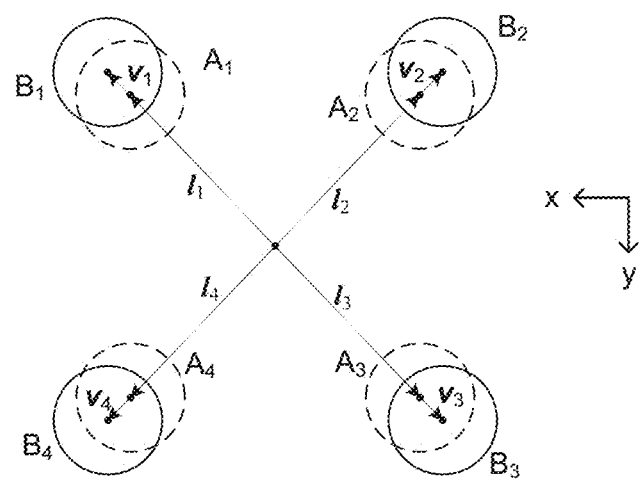
FIG. 15 is a conceptual diagram illustrating an equilibrium state of example solder attachment pads arranged on an optical socket in a first pattern and example solder attachment pads arranged on a printed circuit board in a second pattern that is not congruent to the first pattern.

In order to determine locations of the second pads that are not congruent patterns but that still satisfy $\Sigma f(v_i)=0$ and $\Sigma f(v_i) \times l_i=0$, various approaches could be used. For example, symmetries may be exploited to identify possible locations for the second pads that satisfy the criteria noted above. For example, some (or all) of the second pads may be offset from their corresponding first pad in such a manner that each non-zero pad offset is balanced out by an opposite pad offset and each pad offset is in the same direction as the lever arm of the corresponding first pad. In other words, for each non-zero pad offset vector $v_i$ another one of the pad offset vectors $v_j$ has equal magnitude and opposite direction and each offset vector $v_i$ is parallel to the lever arm $l_i$. In such examples, each of the lateral forces $f_i$ will be canceled out by another one of the forces $f_j$ and therefore $\Sigma f(v_i)=0$. Moreover, the cross product of parallel vectors is zero, and therefore, since each offset is in the direction of the lever arm, $\Sigma f(v_i) \times l_i=0$. FIG. 15 illustrates one such example in which there are offset symmetries. In FIG. 15, each of the second pads $B_1$-$B_4$ is offset from its corresponding first pad $A_1$-$A_4$, however, the pad offset vector $v_1$ is equal and opposite to the pad offset vector $v_3$ and the pad offset vector $v_2$ is equal and opposite to the pad offset vector $v_4$. As a result, the lateral force $f_1$ will be equal and opposite of $f_3$, and the lateral force $f_2$ will be equal and opposite of $f_4$. Thus, the net lateral force F in this state is zero. Furthermore, in the state illustrated in FIG. 15, each of the offset vectors $v_1$-$v_4$ is parallel to the corresponding lever arm $l_1$-$l_4$, and as a result each of the forces $f_1$-$f_4$ is parallel to corresponding lever arm $l_1$-$l_4$. Thus, $f_i \times l_i = 0$ for each i, and therefore the net lateral torque T in this state is zero.

As another example, the locations of the second pads relative to the first pads may be set based on an assumption about the nature of the function $f(v_i)$. For example, if $f(v_i)$ is linear, then the locations of the second pads relative to the first pads may be set such that $\Sigma v_i = 0$ and $\Sigma v_i \times l_i = 0$. As another example, if $f(v_i)$ is quadratic, then the locations of the second pads relative to the first pads may be set such that $\Sigma v_i^2 = 0$ and $\Sigma v_i^2 \times l_i = 0$. The specific nature of the function $f(v_i)$ may depend on the materials used for the solder and the solder attachment pads, as well as on the shape and size of the solder attachment pads. The functional relationship $f(v_i)$ may be estimated for a particular configuration by empirical estimation.

In block 1320, locations of the second pads on the PCB relative to the active optical device may be determined. In particular, in determining the locations of the second pads on the PCB, a pattern of the second pads that was defined in block 1310 may be maintained (i.e., the locations of the second pads relative to one another may be fixed). Moreover, the location of the second pads relative to the active optical device on the PCB may be set such that, if the first and second pads are in the equilibrium state, then the optical socket is in the aligned position.

For example, the locations of the second pads on the PCB relative to the active optical device may be determined as follows. First, identify reference points a and b, where the reference point a is fixed relative to the optical socket and the reference point b is fixed relative to the PCB, and such that the reference points a and b are aligned (from a top-down perspective) when the optical socket is in the aligned position. The location of the reference point a relative to the optical socket may be arbitrarily selected. The location of the reference b relative to the PCB may be deduced from the reference point a, based on the known location of the connector relative to the active optical devices in the aligned position, and the known location of the connector relative to the optical socket (which is fixed by the alignment feature). Second, define a set of vectors $\{r_i\}$ where each $r_i$ is the lateral component of the vector extending from the point a to the center of the $i^{th}$ first pad. Third, determine a set of vectors $\{r_i'\}$ where each $r_i'$ is a lateral vector extending from the point b and where $r_i' = r_i + v_i$. Because the point b is fixed relative to the PCB, the vectors $\{r_i'\}$ (which extend from b) are also fixed relative to the PCB. Finally, for each value of i, the location of the $i^{th}$ second pad relative to the PCB may be set such that the center thereof is at aligned with the end point of $r_i'$.

For example, in FIG. 16, the pattern of second pads from FIG. 15 is used, and reference points a and b on the optical socket 200 and the PCB 300 that are aligned with one another when the optical socket 200 is in the aligned position are identified. The vectors $r_1$-$r_4$ point from a to the centers of the first pads $A_1$-$A_4$, respectively. The locations of the centers of the second pads relative to the PCB are identified based on $r_1$-$r_4$ and $v_1$-$v_4$.

As used herein, "lateral" refers to directions that are parallel to a top surface of a PCB, which is the surface of the PCB on which the active optical devices are attached. In other words, a lateral direction is any direction that is parallel to the x-y plane illustrated in the Figures. Thus, a "lateral force" is a force whose direction is parallel to the top surface of the PCB. Furthermore, a "lateral torque" is a torque resulting from a "lateral force". A "net lateral force" refers to the sum of lateral forces acting on a system. A "net lateral torque" refers to the sum of lateral torques acting on a system. Naturally, it should be understood that the solder exerts non-lateral forces on the solder attachment pads in addition to lateral forces (e.g., the solder exerts an upward force on the pad of the optical socket, which keeps the pad of the optical socket elevated relative to the pad of the PCB). In particular, the total force exerted by a particular volume of solder on a particular solder attachment pad may have an arbitrary direction, which includes some lateral component and some non-lateral component. Thus, when references are made herein to a lateral force or a lateral torque exerted by a volume of solder on an object, it should be understood that this force or torque may be the lateral components of the total force/torque that is exerted by the volume of solder on the object. Accordingly, the "net lateral force" may be considered to be the sum of the lateral components of the forces that are exerted by the volumes of solder on the solder attachment pads of the optical socket. Equivalently, the "net lateral force" may be considered to be the lateral component of the net force exerted by all of the volumes of solder on all of the solder attachment pads of the optical socket. Similarly, the "net lateral torque" may be considered to be the sum of the lateral components of the torques that are exerted by the volumes of solder on optical socket. Equivalently, the "net lateral torque" may be considered to be the lateral component of the net torque exerted by all of the volumes of solder on the optical socket.

As used herein, an optical socket (such as the optical socket 200) is in the "aligned position" when the optical socket is so positioned that, if an optical connector (such as the connector 500) were mated to the optical socket, each of the optical axis of the connector would be aligned with a corresponding light receiving region of the active optical devices (such as the active optical devices 350) and each of the optical axis of the active optical devices would be aligned with a corresponding light receiving region of the connector. In this context, it should be understood that "each" in this definition refers to the set of optical axis and/or light receiving regions that are to be used in communication, but does not necessarily encompass optical axis and/or light receiving regions that are not to be used in communications. For example, it may be the case that a connector may include more (or fewer) optical axis than the number of light receiving regions in the active optical device or the connector may include more (or fewer) light receiving regions than the number of optical axis of the active optical device—in such as case, the "aligned position" would not depend on the "extra" optical axis or light receiving regions. As another example, not every optical axis or light receiving region that is concluded in a connector or in an active optical device is necessarily used in communicating signals (e.g., "dummy" pixels, "black" pixels, defective pixels, etc.)—in such a case, the "aligned position" would not depend on such non-used optical axis or light receiving regions. It may be verified whether an optical socket is in the "aligned position" by any methods that are known in the art for checking alignment, such as the active or vision aided methods referred to above.

References herein to one entity being "aligned" with another entity from a specified perspective mean that, when viewed from the specified perspective the two entities overlap. References herein to an axis being "aligned" with an entity mean that the axis passes through the entity. References herein to one entity being "laterally aligned" with another entity mean that the two entities are aligned from a top-down perspective. Furthermore, all such references to "aligned", "alignment", and the like should be understood to not require exact precision (which is not possible), but rather to allow for deviations from theoretically perfect alignment up to some tolerance level. In certain examples, the tolerance level may be within 10 μm. In other examples, such as the demanding single mode applications, the tolerance level may be within 1 μm. In other examples, such as in certain multi-mode applications, the tolerance level may be within 25 μm.

As used herein, "solder" refers broadly to any alloy that has a melting point lower than the melting points of the optical socket body, the PCB, and solder attachment pads. In other words, any alloy that can be melted via solder reflow without melting the optical socket body, the PCB or the solder attachment pads may be considered "solder". This would include, for example, certain materials that might have been historically identified as solder, such as Sn—Pb solder, but is not limited to such materials.

As used herein, to "provide" an item means to have possession of and/or control over the item. This may include, for example, forming (or assembly) some or all of the item from its constituent materials and/or, obtaining possession of and/or control over an already-formed item.

As used herein "up" and "upward" refer to a direction pointing away from the face of the PCB on which the optical socket is connected—in other words, a direction roughly parallel with the +z direction illustrated in the figures. Similarly, "down" and "downward" refer to a direction opposite of the upward direction—in other words, a direction roughly parallel with the −z direction illustrated in the figures.

As used herein, "top" refers to a side of an object or system that would face upward in the fully assembled optical interface. Thus, for example, a top side of the optical socket 200 corresponds to the face 202, since the face 202 faces upward when the optical socket 200 is connected to the PCB 300. As used herein, a "top-down perspective" refers to a perspective that is located above a top-side of the objects in question and is directed downward toward the objects—in other words, a perspective that faces a top side of the objects along a direction that is parallel to the z-axis in the figures. Similarly, "bottom" refers to a side of an object or system that would face downward in the fully assembled optical interface.

Throughout this disclosure and in the appended claims, occasionally reference may be made to "a number" of items. Such references to "a number" mean any integer greater than or equal to one. When "a number" is used in this way, the word describing the item(s) may be written with the pluralized "s" for grammatical consistency, but this does not necessarily mean that multiple items are being referred to. Thus, for example, "a number of active optical devices, wherein the active optical devices . . . " could encompass both one active optical device and multiple active optical devices, notwithstanding the use of the pluralized form.

Various example processes were described above, with reference to various example flow charts. In the description and in the illustrated flow charts, operations are set forth in a particular order for ease of description. However, it should be understood that some or all of the operations could be performed in different orders than those described and that some or all of the operations could be performed concurrently (i.e., in parallel).

While the above disclosure has been shown and described with reference to the foregoing examples, it should be understood that other forms, details, and implementations may be made without departing from the spirit and scope of this disclosure.

What is claimed is:

1. A device that has an optical interface comprising:
a printed circuit board ("PCB");
an active optical device attached to a first side of the PCB;
an optical socket attached to the first side of the PCB and configured to receive and align an optical connector of an optical cable, the optical socket comprising:
an alignment feature that is to engage the optical connector,
an opening defining a window, the window configured to allow the active optical device to extend from the first side of the PCB into the opening when the optical socket is attached to the first side of the PCB, and
first solder attachment pads arranged in a first pattern;
second solder attachment pads arranged in a second pattern on the first side of the PCB; and
solder connecting each of the first solder attachment pads to a corresponding one of the second solder attachment pads,
wherein the first pattern and the second pattern are arranged so as to enable the solder, when reflowed, to passively align the optical socket relative to the active optical device by way of the solder automatically forcing the optical socket into an aligned position.

2. The device of claim 1,
wherein the first pattern and the second pattern are such that, when the solder is reflowed, an equilibrium position for the optical socket according to forces exerted by the solder is the aligned position.

3. The device of claim 1,
wherein the first pattern and the second pattern are congruent.

4. A device that has an optical interface comprising:
an optical socket that has:
an alignment feature that is to engage an optical connector, and
first solder attachment pads arranged in a first pattern;
a printed circuit board ("PCB") that has an active optical device and second solder attachment pads arranged in a second pattern; and
solder connecting each of the first solder attachment pads to a corresponding one of the second solder attachment pads,
wherein the first pattern and the second pattern are arranged so as to enable the solder, when reflowed, to passively align the optical socket relative to the active optical device by way of the solder automatically forcing the optical socket into an aligned position,
wherein the first pattern and the second pattern are not congruent and are positioned relative to each other such that a restoring force in the reflowed solder at one or more of the solder attachment pads is non-zero when the optical socket is in the aligned position, and
wherein the optical socket comprises an opening defining a window, the window configured to allow the active optical device to extend from the first side of the PCB into the opening when the optical socket is attached to the first side of the PCB.

5. A device that has an optical interface comprising:
an optical socket that has:
a non-metallic body comprising an alignment feature that is to engage an optical connector,
an attachment part embedded in the non-metallic body, and a plurality of holes disposed in the non-metallic body and configured to expose first solder attachment pads arranged in a first pattern;
a printed circuit board ("PCB") that has an active optical device and second solder attachment pads arranged in a second pattern; and
solder connecting each of the first solder attachment pads to a corresponding one of the second solder attachment pads,
wherein the first pattern and the second pattern are arranged so as to enable the solder, when reflowed, to passively align the optical socket relative to the active optical device by way of the solder automatically forcing the optical socket into an aligned position, and
wherein the optical socket comprises an opening defining a window, the window configured to allow the active optical device to extend from the first side of the PCB into the opening when the optical socket is attached to the first side of the PCB.

6. The device of claim 5,
wherein a portion of the attachment part extends outside of the non-metallic body and is configured to reduce thermal resistance between the active optical devices and atmospheric ambient.

7. The device of claim 1,
wherein the optical socket includes:
a non-metallic body that has the alignment feature, and
attachment pads on the body, the attachment pads being instances of the first attachment pads.

8. The device of claim 1,
wherein the alignment feature is to, while engaging the optical connector, constrain lateral movement, yaw, pitch, and roll of the optical connector.

9. The device of claim 1,
wherein the alignment feature comprises at least one depression in a body of the optical socket.

10. The device of claim 1,
wherein the alignment feature comprises at least one protrusion from a body of the optical socket.

11. The device of claim 1,
wherein the first pattern and the second pattern are arranged so as to enable the solder, when reflowed, to passively align the optical socket relative to the active optical device by the way of the solder automatically forcing the optical socket into an aligned position without relying on any other alignment mechanism.

12. The device of claim 1,
wherein first pattern and the second pattern are such that the center of each of the first solder attachment pads is laterally aligned with the center of a corresponding one of the second solder attachment pads.

13. The device of claim 12,
wherein the optical socket comprises:
a non-metallic body comprising the alignment feature,
an attachment part embedded in the non-metallic body, and
a plurality of holes disposed in the non-metallic body and configured to expose the first solder attachment pads.

14. The device of claim 13,
wherein a portion of the attachment part extends outside of the non-metallic body and is configured to reduce the thermal resistance between the active optical devices and atmospheric ambient.

15. A method, comprising:
providing the device of claim 1,
using the solder to passively align the optical socket relative to the active optical device by reflowing the solder, wherein the aligning does not rely on any alignment mechanism besides the solder.

16. The device of claim 1,
wherein the first pattern and the second pattern are not congruent and are positioned relative to each other such that the restoring force in the reflowed solder at one or more of the solder attachment pads is non-zero when the optical socket is in the aligned position.

17. The device of claim 1,
wherein the optical socket includes:
a non-metallic body that has the alignment feature, and
an attachment part embedded in the body,
the body has holes that expose portions of the attachment part, and
the portions of the attachment part that are exposed by the holes are instances of the first attachment pads.

18. The device of claim 17,
wherein a portion of the attachment part extends outside of the non-metallic body and is configured to reduce thermal resistance between the active optical devices and atmospheric ambient.

19. The device of claim 17,
wherein a portion of the attachment part extends outside of the non-metallic body and is connected to a heat sink.

20. The device of claim 17
wherein the attachment part is metal.

* * * * *